INVENTOR.
ROBERT M. SHUMAN
WILLIAM C. SERJAK
BY

AGENT

INVENTOR.
ROBERT M. SHUMAN
WILLIAM C. SERJAK

AGENT

United States Patent Office 3,177,706
Patented Apr. 13, 1965

3,177,706
FLUID INSPECTION DEVICE
Robert M. Shuman and William C. Serjak, Tucson, Ariz., assignors to Hughes Aircraft Company, Culver City, Calif., a corporation of Delaware
Filed Jan. 24, 1963, Ser. No. 253,544
2 Claims. (Cl. 73—61)

This invention relates generally to fluid inspection devices and more particularly to fluid inspection devices affording the inspection of a fluid in a fluid line or system without removing the fluid from the line.

The manufacture of a fluid product which must meet certain cleanliness standards or which must be certified as to the absence of contamination when used in the manufacture of a product requires an adequate fluid inspection device providing a physical analysis of particular fluids.

Where precise information on a fluid product is desired, it has been common practice to extract a given quantity of the fluid from the fluid line or system. The fluid that is extracted is normally extracted into a container and is thereafter filtered. The residue on the filter is usually microscopically or electronically scanned and analyzed. While this procedure affords a rather precise examination of the fluid it comprises operations in which a high probability of fluid contamiantion exists, that is, a dirty container, a dirty filter or a dirty environment all offer a possibility of contaminating the fluid. Additionally, this procedure is slow and relatively expensive.

Efforts to overcome some of the problems in fluid analyzing procedures as outlined above have resulted in the development of a variety of fluid viewing devices which are connected into a fluid line or a conduit so that fluid flows therethrough. These viewing devices are provided with one or more windows through which the fluid may be observed. Since the fluid is always contained in the fluid system the possibility of external contamination is eliminated. However, the advantages of precise laboratory analysis are lacking in prior art viewing devices.

One object of this invention is to provide an improved fluid inspecting device.

Another object of this invention is to provide an improved fluid inspecting device in which external contamination of a fluid sample is eliminated.

It is also an object of this invention to provide a fluid inspecting device which is applicable directly to fluid systems of almost any pressure by simple changes in structural design to withstand the fluid forces.

A further object of this invention is to provide a fluid inspection device applicable directly to a fluid line or fluid system and which provides rapid and precise inspection of fluids.

The aforesaid and other objects and advantages are achieved in a fluid inspection device according to one embodiment of this invention having inlet and outlet connections, at least the inlet connections of which is connected into the fluid line or system and includes a fluid port directed into the fluid stream or the fluid path in the line. The outlet connection may be coupled downstream of the inlet connection in the fluid line or may be returned to drain or to a sump forming part of the fluid system. In any event, these connections are arranged to provide a fluid pressure drop across the fluid inspection device to move fluid therethrough.

The fluid inspection device comprises a housing or body having inlet and outlet ports receiving the inlet and outlet connections and having a cavity communicating with the inlet and outlet ports. The cavity opens through opposite sides of the housing in internally or externally threaded openings receiving externally or internally threaded tubular bushings terminating in open mating confronting extremities in the cavity. These open extremities are sealed by glass plates or other suitable transparent plates. One bushing defines a light source aperture and the other an observation aperture.

Suitable O rings or other type of gaskets seal the bushings in the openings in the housing and rotation of one or both of the bushings relative to the housing axially displaces the bushings. By this expedient the distance between the confronting faces of the glass plates may be varied to control the film thickness of the fluid therebetween. Suitable thread pitch gives precise control of film thickness. One or both of the glass plates may be recessed in its bushing so that when the mating extremities of the bushings are seated, one on the other, sealing fluid between the glass plates a predetermined minimal spacing between the plates is maintained. This distance may be varied to accommodate different types of fluid. The ability to engage the mating extremities of the bushings to seal fluid between the glass plates permits fluid inspection at zero flow rate when desired.

A light source on one side of the housing at the light source aperture illuminates the fluid in the cavity between the glass plates. A microscope, camera, photocell, oscilloscope or other suitable device or selected combinations of such devices at the observation aperture provides a facility for visually inspecting and/or recording the fluid between the glass plates.

This invention will be better understood upon a study of the following specification when considered in conjunction with the accompanying drawings in which.

Figure 1:
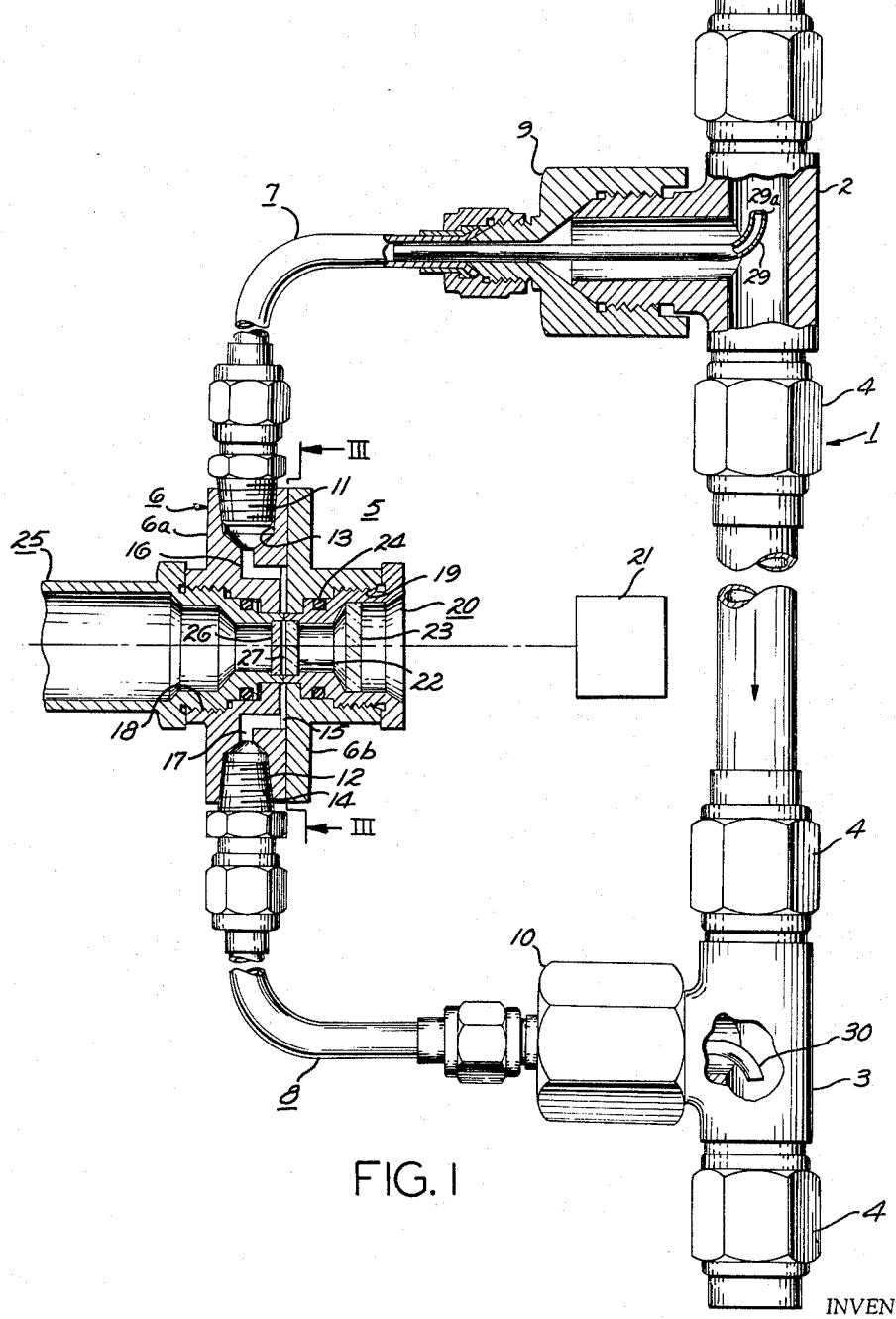
FIGURE 1 is a side elevational view partially in section of a fluid inspection device embodying the principles of this invention.

In the arrangement illustrated in FIG. 1 a fluid line, generally designated 1, is arranged to conduct fluid therethrough in the direction indicated by the arrow. The fluid may be under any particular pressure associated with a particular fluid system. The fluid line 1 comprises a pair of pipe T's 2 and 3 arranged at spaced points in the fluid line 1 and coupled thereto by suitable conventional tubing connectors comprising nuts 4 which are used to secure the connections.

Figure 2:
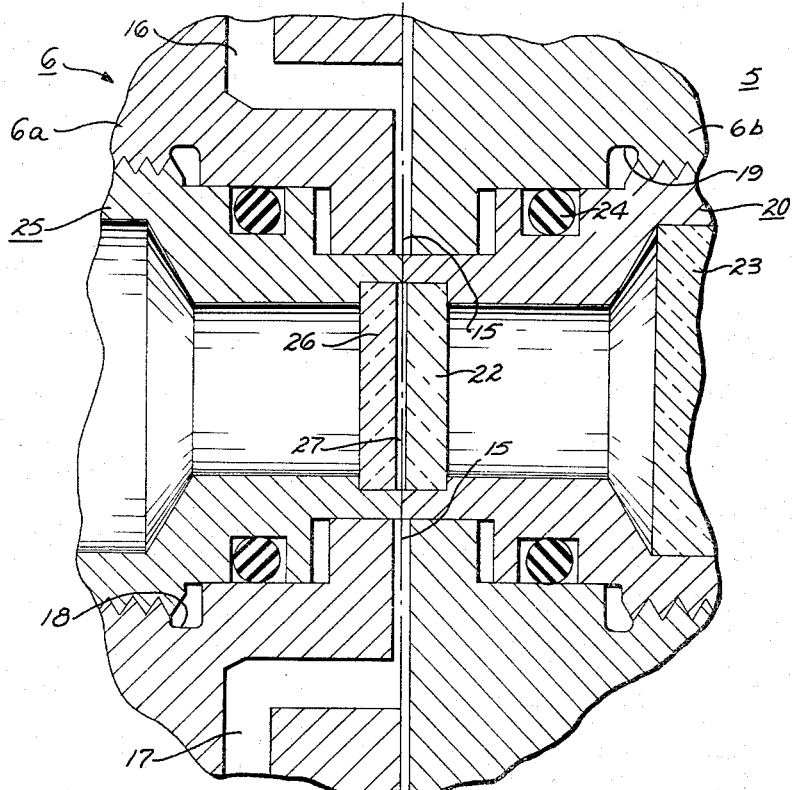
FIG. 2 is an enlarged view of a portion of the fluid inspecting device of FIG. 1 showing specific details of the construction of the fluid inspecting device and the fluid path therethrough.
Figure 3:
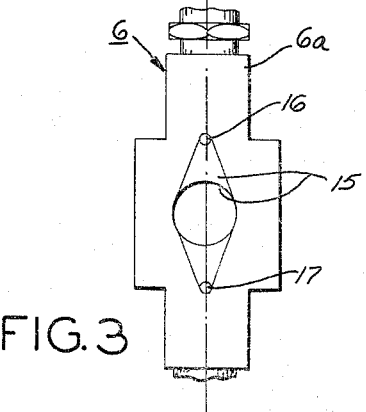
FIG. 3 is a sectional view taken on line III—III of FIG. 1.

A fluid inspection device, generally designated 5 (see also FIGS. 2 and 3), and comprising a housing or body 6 is connected between the pipe T's 2 and 3 by means of fluid lines, generally designated 7 and 8, respectively. These fluid lines are coupled to the respective T's through conventional tubing connectors, generally designated 9 and 10, and the fluid lines terminate in tapered threaded extremities 11 and 12, respectively, which are respectively threaded into or onto an inlet port 13 and an outlet port 14 in the housing 6.

The housing 6 is comprised of two housing sections, respectively designated 6a and 6b. When assembled these housing sections define a fluid cavity 15 communicating with the inlet and outlet ports 13 and 14 through respective fluid passages 16 and 17 and opening through opposite sides of the housing assembly in internally or externally threaded openings 18 and 19. An externally or internally threaded bushing 20 threads into the opening 19. Bushing 20 is essentially of circular cross-section and has an axial opening therethrough comprised of axially spaced sections of differing diameter. Bushing 20 has an open extremity which terminates in the cavity 15 whenever the bushing 20 is threaded completely into the opening 19. The opening through the bushing 20 defines a light source aperture emitting light therethrough from a suitable light source 21 which is represented only in block form in the interest of convenience. This may be any suitable type of light source. The bushing 20 mounts two transparent plates which may be glass or any other suitable transparent material. The first of these is a glass plate 22 with a thin line of marking on the internal surface as a focal point or calibration dimension which is mounted in a suitable recess in the open extremity of bushing 20 and is recessed sufficiently so that the surface thereof adjacent the cavity 15 is set back from the extremity of the bushing. A second glass plate 23 of light diffusing characteristic is secured in a larger diameter section of the bushing 20 at a point adjacent its outer end. The glass plates may be secured in the bushing by means of any suitable cementing material, adhesive material or other bonding material.

The leakage of fluid past the bushing is prevented by means of an O ring 24 or other suitable seal which is secured in an annular recess in the bushing forward of the threaded portion thereof. The O ring 24 or seal is of slightly larger diameter than the radial depth of the recess and consequently when unrestrained projects therefrom. When installed in the opening 19 the O ring or seal is compressed within the recess maintaining a fluid-tight seal at least between the bottom of the recess and the internal surface of opening 19 with which the O ring or seal is engaged.

A bushing 25 has an externally or internally threaded portion which threads into the opening 18. When bushing 25 is threaded substantially completely into the opening 18 its extremity terminates in the cavity 15 and as shown engages and seats upon the extremity of the bushing 20. The extremities of these bushings are shaped so that they mate and seat and provide a fluid-tight seal when tightly engaged. The open extremity of bushing 25 is sealed by means of a glass plate 26. An O ring or seal 28 seals bushing 25 in opening 18.

The opening through the bushing 25 defines an observation aperture and the bushing may mount or receive any suitable type of device such as named hereinabove, permitting observation of the fluid film in an aperture 27 defined between the confronting faces of the glass plates 22 and 26.

As will be seen from inspection of FIG. 1, rotation of one or both of the bushings is effective to vary the spacing between the confronting surfaces of the glass plates 22 and 26 from the minimum distance determined by the amount the glass plate 22 is recessed in the extremity of bushing 20 to such larger distance as is desired. The fixed minimum spacing between the surfaces of the glass plates may be adjusted during manufacture for any particular desired film thickness depending upon the nature of the fluid that is to be inspected.

Fluid pressure is maintained across the fluid inspecting device 5 by means of an arrangement of small fluid pickup and return conduits 29 and 30. The conduit 29 is secured within the fluid line 7 and terminates in a curved extremity which is pointed into the fluid stream in the fluid line 1. The internal diameter of tube 29 may be so selected, or its extremity 29a suitably inwardly swaged, to provide a definite proportion of the fluid flow and/or selected fluid pressure in the fluid line 7 and consequently a flow rate of any suitable magnitude for inspection purposes. The outlet tube 30 is similarly shaped but is directed downstream and thus discharges fluid in the same direction as the fluid is flowing through the pipe.

Although but one embodiment of this invention has been illustrated herein, it will be appreciated by those skilled in the art that the invention may be modified as to its details without departing from the spirit and scope of this invention. For instance, the fluid line 8 need not be returned to the main fluid line 1, but may be returned to a drain or to a sump which may or may not be associated with the fluid system comprising the line 1. Additionally, it will be apparent that modifications may be made in the construction details of the fluid inspection devices, particularly with respect to the adjustable bushings controlling the fluid apertures. Accordingly it is intended that the foregoing disclosure and the showings made in the drawings shall be considered only as illustrative of the principles of this invention and are not to be construed in a limiting sense.

What is claimed is:
1. A fluid inspection device comprising:
a housing having a fluid inlet port, a fluid outlet port and a cavity communicating with both of said ports and having openings extending through opposite sides of said housing;
a pair of axially displaceable hollow bushings disposed in said openings, respectively, and having open confronting mating extremities in said cavity;
and a transparent plate in each of said open confronting mating extremities, sealing said hollow bushings, one of said transparent plates being recessed from the extremity of its bushing maintaining a spacing between the faces of said transparent plates when said mating extremities are engaged.

2. A fluid inspection device comprising:
a housing having a fluid inlet port, a fluid outlet port and a cavity communicating with both of said ports and having openings through opposite sides of said housing;
a pair of axially displaceable hollow bushings coupled to said housing in said openings, respectively, and having open confronting mating extremities in said cavity;
and a transparent plate in each of said open confronting mating extremities, sealing said hollow bushings, one of said transparent plates being recessed from the extremity of its bushing maintaining a spacing between the faces of said transparent plates when said mating extremities are engaged.

References Cited by the Examiner

UNITED STATES PATENTS

| | | | |
|---|---|---|---|
| 1,926,084 | 9/33 | Clark | 73—61 X |
| 2,363,625 | 11/44 | Swearingen | 73—422 |
| 2,475,857 | 7/49 | Reinert | 73—421.5 |
| 2,690,695 | 10/54 | Coates | 33—164 |
| 3,014,981 | 12/61 | Appl | 116—117 X |

RICHARD C. QUEISSER, *Primary Examiner.*

DAVID SCHONBERG, *Examiner.*